United States Patent [19]

Friedberg

[11] E Re. 31,487

[45] Reissued Jan. 10, 1984

[54] SLIDE FASTENER WITH IMPROVED END CONNECTIONS

[76] Inventor: Martin F. Friedberg, 13534 Preston Rd., Suite 206, Dallas, Tex. 75240

[21] Appl. No.: 382,170

[22] Filed: May 26, 1982

Related U.S. Patent Documents

Reissue of:

[64] Patent No.: 4,326,319
Issued: Apr. 27, 1982
Appl. No.: 82,727
Filed: Oct. 9, 1979

U.S. Applications:

[63] Continuation-in-part of Ser. No. 20,318, Mar. 15, 1979, Pat. No. 4,232,430, which is a continuation-in-part of Ser. No. 940,255, Sep. 7, 1978, Pat. No. 4,232,429, which is a continuation-in-part of Ser. No. 895,935, Apr. 13, 1978, abandoned.

[51] Int. Cl.[3] ..... A44B 19/36

[52] U.S. Cl. ..... 24/386; 24/433; 24/435

[58] Field of Search ..... 24/205.11 R, 205.11 F, 24/205.11 L, 208 A

[56] References Cited

U.S. PATENT DOCUMENTS

| | | | |
|---|---|---|---|
| 1,704,579 | 3/1929 | Sanford | 24/205.11 R |
| 3,004,318 | 10/1961 | Weiser | 24/205.11 R X |
| 4,078,279 | 3/1978 | Heimberger | 24/205.11 R |
| 4,139,927 | 2/1979 | Heimberger | 24/205.11 R |
| 4,221,026 | 9/1980 | Kanzaka | 24/205.11 R |
| 4,232,429 | 11/1980 | Friedberg | 24/205.11 R |
| 4,232,430 | 11/1980 | Friedberg | 24/205.11 R |
| 4,308,645 | 1/1982 | Hasegawa | 24/205.11 R |

FOREIGN PATENT DOCUMENTS

| | | | |
|---|---|---|---|
| 117965 | 1/1930 | Australia | 24/205.11 R |
| 38450 | 3/1931 | France | 24/205.11 R |
| 363596 | 12/1931 | United Kingdom | 24/205.11 R |

*Primary Examiner*—Robert A. Hafer
*Attorney, Agent, or Firm*—Richard A. Bachand

[57] ABSTRACT

An improved device for fastening a separable zipper includes specially adapted terminals disposed at the respective ends of opposed rows of zipper teeth and a specially adapted slider supported by one of the terminals. The slider is provided with an annular disc which can be inserted in a cooperating aperture of the other terminal by movement in a direction substantially perpendicular to the zipper rows. A second embodiment of the invention includes specially adapted terminals and two sliders, the sliders being disposed in back-to-back relationship and supported on one of the terminals, the sliders including an annular disc separable into semicircular halves for guiding the sliders into nesting engagement with the other terminal by movement in the direction substantially perpendicular to the zipper rows.

12 Claims, 11 Drawing Figures

FIG. 5
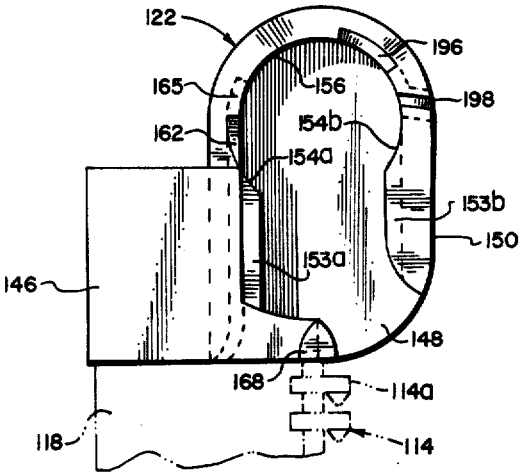
FIG. 6
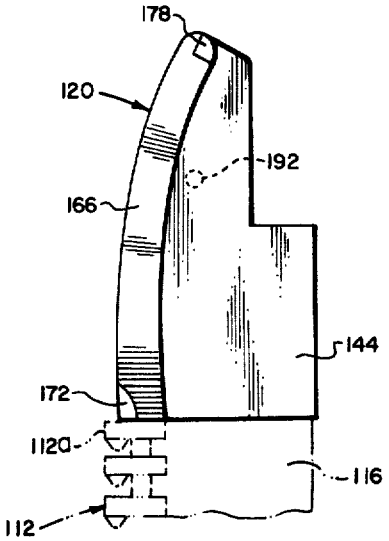
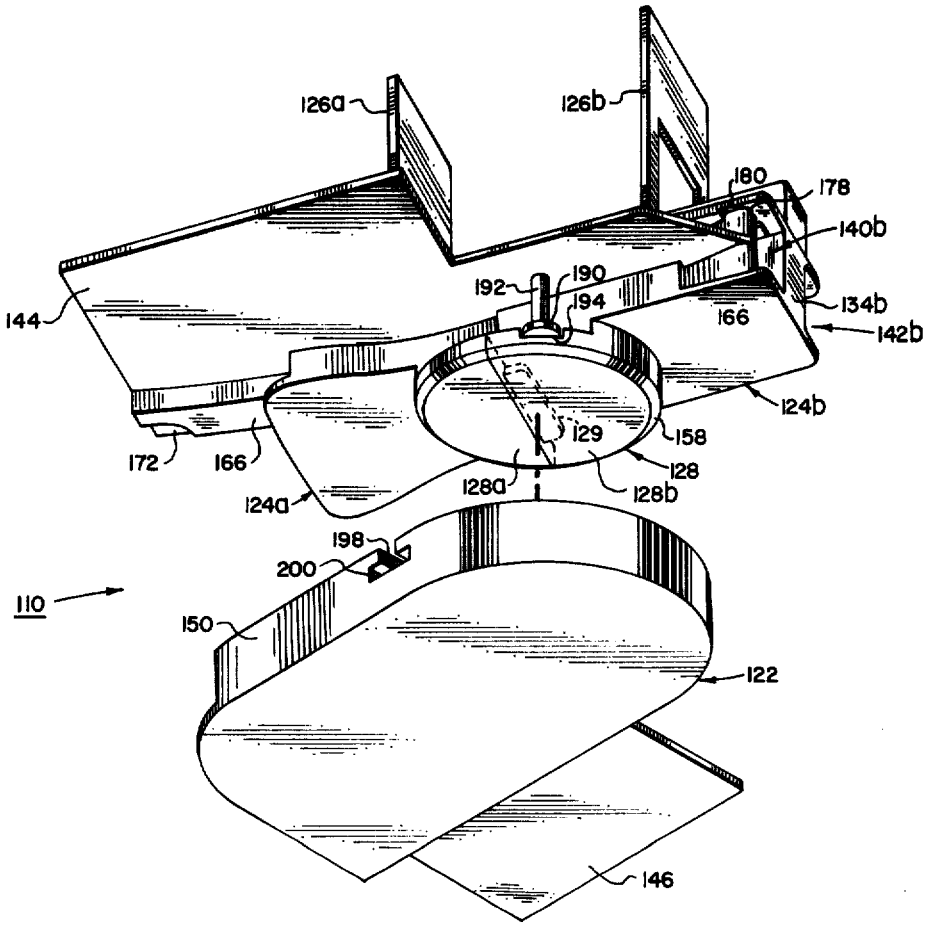
FIG. 7

SLIDE FASTENER WITH IMPROVED END CONNECTIONS

Matter enclosed in heavy brackets [ ] appears in the original patent but forms no part of this reissue specification; matter printed in italics indicates the additions made by reissue.

This application is a *reissue of U.S. Pat. No. 4,326,319, which issued Apr. 27, 1982 upon application Ser. No. 82,727, filed Oct. 9, 1979, which was a* continuation-in-part of my co-pending U.S. application Ser. No. 20,318 filed Mar. 15, 1979, now U.S. Pat. No. 4,232,430 which in turn is a continuation-in-part of application Ser. No. 940,255, filed Sept. 7, 1978, now U.S. Pat. No. 4,232,429 which in turn is a continuation-in-part of abandoned U.S. application Ser. No. 895,935, filed Apr. 13, 1978, abandoned. All of the subject matter of said prior applications is incorporated herein by reference to the extent said subject matter is consistent with the following description of the present invention.

The present invention pertains generally to slide fasteners and more particularly to the type of slide fastener commonly known as a zipper which has opposed strings or rows of interlocking elements or zipper teeth which are brought into interlocking engagement by the movement of a slider in one direction along the rows and disengaged or unfastened by movement of the slider in the opposite direction.

The present invention addresses the problem or reducing the difficulty involved with the initial engagement of ends of a separable zipper on a jacket or similar garment. It will be appreciated, however, that the solution provided by the present invention has useful application to the entire field of slide fasteners. The present invention permits the ends of a separable zipper to be interconnected and the zipper to be fastened with a minimum of care and dexterity.

In accordance with a first embodiment of the invention, a device for connecting the ends of a separable zipper includes a slider [having first and second ports separated by a center post at the front of the slider, the ports being adapted to receive first and second opposed rows of zipper teeth and guide the zipper teeth into a common passageway rearward from the center post within which the teeth in the opposed rows are] progressively [forced] *forcing the interlocking elements* into interlocking engagement as the slider is pulled forward. The device further includes a base terminal disposed at the rearward end of the first row of [teeth] *interlocking elements;* and a receiving terminal disposed at the rearward end of the second row of [teeth] *interlocking elements,* the base terminal being adapted to carry the slider when the rows are fully disengaged and the terminals are separated. The device further includes a generally annular member affixed to the bottom of the slider for guiding the slider, when in its rearmost position on the base terminal, into a cooperating aperture in the receiving terminal by movement in a direction generally perpendicular to the plane through which the zipper rows move when passing through the slider.

In accordance with a second embodiment of the invention, a device for connecting the ends of a separable zipper having first and second opposed rows of zipper [teeth] *interlocking elements* includes a leading slider and a trailing slider adapted to progressively engage the zipper rows by the forward movement of the leading slider and progressively disengage zipper rows by the forward movement of the leading slider following in the path of the leading slider. The device further includes a base terminal disposed at the rearward end of the first row of teeth and a receiving terminal disposed at the rearward end of the second row of [teeth] *interlocking elements,* the base terminal being adapted to carry the sliders when the rows of [teeth] *interlocking elements* are fully disengaged and the terminals are separated. The device further includes a generally annular member affixed to the bottom of at least one of the sliders for guiding the sliders, when in their rearmost position on the base terminal, into a cooperating aperture in the receiving terminal by movement in a direction generally perpendicular to the plane through which the zipper rows move when passing through the sliders.

The presently preferred way of carrying out the invention is described in detail below with reference to the drawings which illustrate two specific embodiments, in which:

FIG. 1 is a perspective view of a first embodiment of the present invention showing first and second zipper terminals aligned just prior to engagement, the first terminal or base terminal carrying a slider adapted to fasten conventional rows of zipper teeth which are shown in phantom, the second terminal or receiving terminal being adapted to engage the slider and first terminal in the indicated manner;

FIG. 5 is a top plan view of a receiving terminal in accordance with a second embodiment of the invention;

FIG. 6 is a top plan view of a base terminal in accordance with the second embodiment;

FIG. 7 is a perspective view from below and slightly rearward of the terminals of FIGS. 5 and 6, including first and second back-to-back sliders in their rearmost position on the base terminal, the sliders and terminals being aligned just prior to being brought into operative engagement in the indicated manner;

Figure 1:
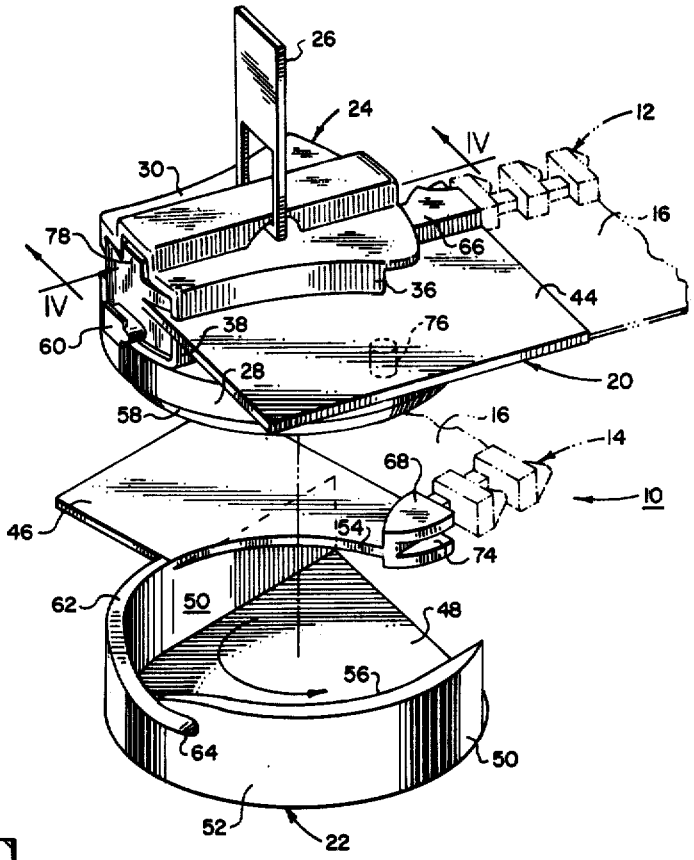
Figure 2:
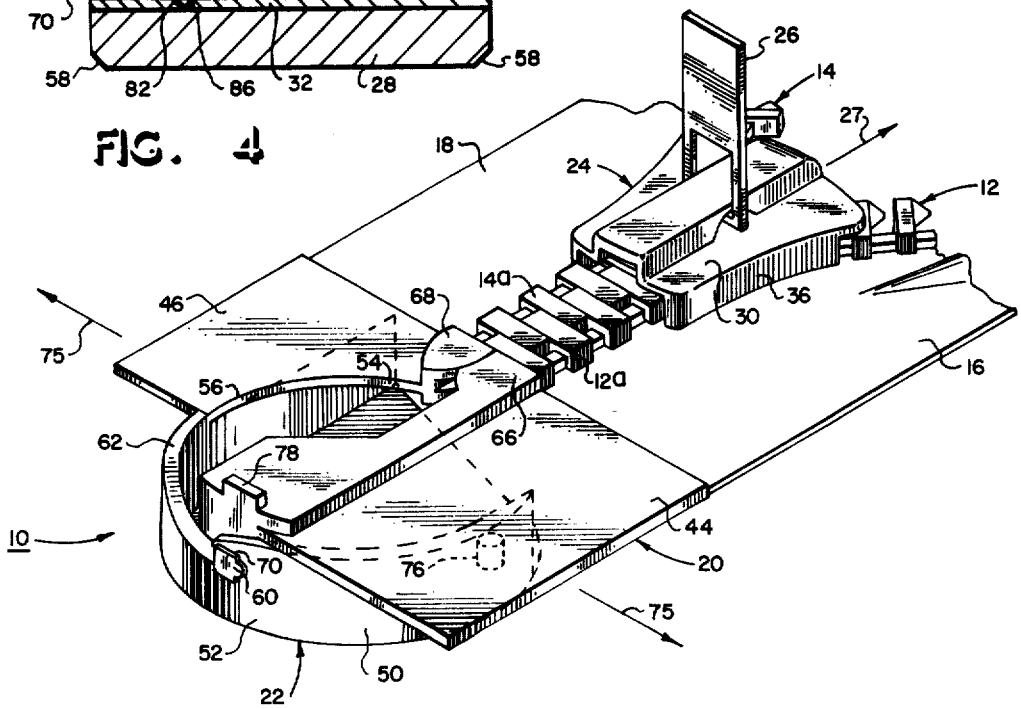
FIG. 2 is a perspective view showing the terminals interlocked in operative engagement and the slider moved slightly forward up the rows of zipper teeth.

Referring to FIGS. 1–4, a device for connecting the ends of a separable zipper is illustrated and designated generally by reference 10. With particular reference to FIG. 2, the zipper includes interlocking elements or teeth arranged in adjacent opposing rows 12 and 14 in a conventional manner along the respective edges of flexible supporting sheets or stringers 16 and 18. The device 10 includes a first terminal or slider base terminal 20 and a second terminal or receiving terminal 22. As [see] *shown* in FIG. 1, the slider base terminal 20 is adapted to carry a slider 24, which is illustrated separately in FIG. 3. The slider 24 is manually operable for fastening the zipper rows 12 and 14 by means of a handle 26 pivotally mounted atop the slider 24. Pulling the slider 24 forward as indicated by the arrow 27 in FIG. 2 engages the zipper rows 12 and 14 which can then be disengaged by pulling the slider 24 in the opposite or rearward direction. In as much as the zipper rows 12 and 14 and supporting stringers 16 and 18 are essentially conventional, they have merely been schematically depicted in phantom in FIG. 1 for ease of illustration.

Figure 3:
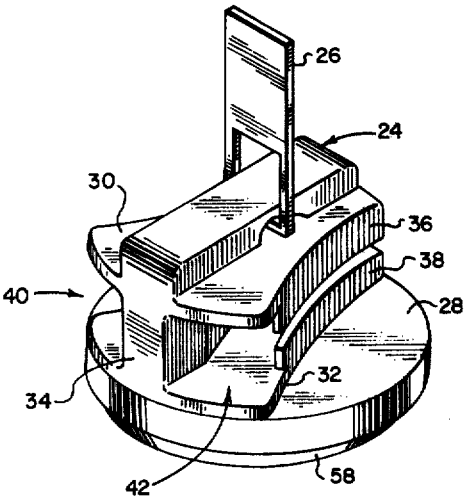
FIG. 3 is a perspective view of the specially adapted slider shown separately.

In accordance with a unique feature of the present invention, an annular disc 28 is affixed to the bottom of the slider 24 as seen best in FIG. 3. The purpose and function of the disc 28 will be described in detail below. More conventional portions of the slider 24 include top and bottom plates 30 and 32 held in spaced-apart parallel planes by a center post 34. The top plate 30 is provided with downwardly extending rims 36 and the bottom plate 32 is provided with upwardly extending rims 38. Adjacent opposing pairs of such rims 36 and 38 define conventional side slots through which the stringers 16 and 18 pass as the slider 24 travels along the zipper rows 12 and 14. As the slider 24 moves forward, the teeth in the opposed rows 12 and 14 enter respective slider ports 40 and 42 defined between the center post 34 and the respective front edges of the rims 36 and 38. As the zipper rows 12 and 14 pass through the slider 24, the individual teeth are progressively brought into interlocking engagement within the slider 24 in the conventional manner. Since the stringers 16 and 18 are ordinarily flexible, the full length of each stringer will not necessarily lie in a single plane. However, portions of the stringers 16 and 18 will lie in what will be referred to herein as the "slider working plane" as they pass through the slider 24. It will be appreciated that the slider working plane is parallel to and lies intermediate the planes defined by the top and bottom plates 30 and 32 of the slider 24.

The terminals 20 and 22 are securely fastened to the respective zipper rows 12 and 14 by attaching the stringers 16 and 18 to respective wing plates 44 and 46 on each terminal 20 and 22 in a suitable manner such as that which is described in my copending application Ser. No. 20,318. The wings 44 and 46 lie in the same planes as their respective stringers 12 and 14 and become coplanar in the slider working plane whenever the terminals 20 and 22 are operatively engaged as seen in FIG. 2. The wings 44 and 46 are sufficiently thin that they can pass through the side slots of the slider 24; which can therefore be readily moved from the position shown in FIG. 2 to its rearmost position within the receiving terminal 22.

The receiving terminal 22 includes a floor plate 48 lying in a plane below and parallel to the wing 46, as seen best in the view of FIG. 1. A sidewall 50 extends upward from the periphery of the floor 48 to support the wing 46. The sidewall 50 includes a rearward portion 52 which is curved through an arc of 180 degrees so that the disc 28 can move forward out of the receiving terminal 22 as the slider 24 is pulled forward to fasten the zipper rows 12 and 14. The wing 46 includes a curved edge 54 which lies in the same circular arc defined by the interior surface of the curved rearward portion 52 of the sidewall 50. The curved edge 54 and the upper interior edge of the wall portion 52 define an aperture 56 extending through an arc of about 270 degrees for receiving the disc 28 as the slider 24 is brought down into the terminal 22 from the position illustrated in FIG. 1. The disc 28 includes a chamfered lower edge 58 adapted to facilitate guiding the disc 28 into the receiving aperture 56.

In order to fasten the zipper, the terminals 20 and 22 must first be brought into interlocking engagement as depicted as FIG. 2 from a separated position as depicted in FIG. 1. Briefly, with the slider 24 in its rearmost position on the slider base terminal 20 the assembly of the slider 24 and terminal 20 is first oriented relative to the receiving terminal 22 substantially as shown in FIG. 1 and then brought down into the terminal 22 until a locking element 60 extending rearward from the slider base terminal 20 meets a ramp 62 formed by an upper edge of the sidewall 50. While forcing the terminals 20 and 22 together, the assembly of the slider 24 and its base terminal 20 is then rotated relative to the receiving terminal 22 in the direction indicated by the curved arrow in FIG. 1 until the locking element 60 moves into a notch 64 formed within the sidewall 50 at the lower rearward end of the ramp 62. At this stage, the wings 44 and 46 will have become essentially coplanar and the bottom surface of the disc 28 will abut the top surface of the floor 48. Once the terminals 20 and 22 have been operatively engaged in the foregoing manner, the slider 24 can be pulled forward up the zipper rows 12 and 14 to progressively fasten the teeth as depicted in FIG. 2. Guide segments 66 and 68 are formed on the forward mutually adjacent portions of the wings 44 and 46 to assist the initial forward movement of the slider 24 in the proper direction in a manner similar to that which more fully described in my copending application Ser. No. 20,318. Pulling the slider 24 forward from its rearmost position to fasten the zipper rows 12 and 14 will not cause the slider base terminal 20 to move forward relative to the receiving terminal 22 since the locking element 60 is provided with flanged portions 70 which abut the outer vertical surface of the sidewall 50 as depicted in FIG. 2.

It will be appreciated that the guide segments 66 and 68 will be separated transversely by a slight amount as the slider 24 begins its forward movement from its rearmost position within the terminal 22 because the center post 34 must pass between the guide segments 66 and 68. The degree of separation of the guide segments 66 and 68 during such initial forward movement of the slider 24 will be limited by the side rims 36 and 38 of the slider 24 engaging cooperating edges of the guide segments 66 and 68. As the center post 34 of the slider 24 passes beyond the guide segments 66 and 68, they will be forced together within the interior passageway of the slider 24 by the side rims 36 and 38 which taper inwards from front to back as will be appreciated by those skilled in the art. Any slight relative rotation of the terminals 20 and 22 during such initial forward movement of the slider 24 will not cause the locking element 60 to move entirely out of the notch 64 since the notch 64 is made long enough to compensate for such slight rotation.

Once the slider 24 has been pulled forward to at least partially fasten the zipper rows 12 and 14, the terminals 20 and 22 will be interlocked in the position shown in FIG. 2. Relative movement of the terminals 20 and 22 in the axial direction (i.e., the direction perpendicular to the floor 48) is prevented at the rear by the locking element 60 lodged within the notch 64 and at the front by a tongue 72 (FIG. 1) extending transversely from the guide segment 66 into a groove 74 in the guide segment 68. Pulling apart the terminals 20 and 22 in the transverse direction, as indicated by the arrows 75 in FIG. 2, is prevented at the rear once again by the locking element 60 nested within the notch 64 at the front by the interlocking effect of at least the rearmost teeth 12a and 14a of the zipper rows 12 and 14. Pushing the terminals 20 and 22 together in the transverse direction to attempt to withdraw the locking element 60 from the notch 64 is prevented by a downwardly extending post 76 (shown in dotted outline) which is secured to the underside of the wing 44 and abuts the outer edge of the sidewall 50 when the terminals 20 and 22 are interlocked as shown in FIG. 2.

Separation of the terminals 20 and 22 proceeds as follows. The slider 24 is pulled rearward from a position such as that depicted in FIG. 2 until it enters the terminals 20 and 22 and reaches its rearmost position therein. During this process, the center post 34 of the slider 24 passes between and separates the guide segments 66 and 68, which causes a slight initial relative rotation of the terminals 20 and 22. Since the zipper rows 12 and 14 are no longer interlocked, the terminals 20 and 22 are free to continue their rotation relative to each other until the locking element 60 is withdrawn from the notch 64. During such rotation, the post 76 slides rearward along the outer surface of the sidewall 50. Once the locking element 60 has been withdrawn from the notch 64, the terminals 20 and 22 can be separated by pulling axially upward on the wing 44 axially downward on the wing 46 to return the terminals 20 and 22 to a separated position such as depicted in FIG. 1. Although the terminals 20 and 22 can thus be separated, rearward movement of the slider 24 off its base terminal 20 is prevented by an end stop 78 extending upwardly from terminal 20 to contact a rearward wall portion 80 of the slider 24, as seen in the sectional view of FIG. 4.

Figure 4:
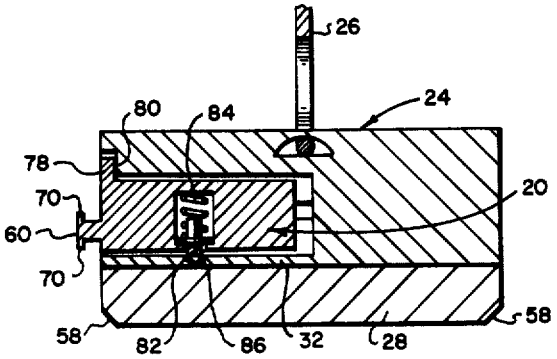
FIG. 4 is a vertical cross-section of the slider and a rearward portion of the base terminal taken along the line 4—4 of FIG. 1 in the direction indicated.

As an optional desirable feature of the inventive device 10, a mechanism which tends to hold the slider 24 in its rearmost position on the slider base terminal 20 to facilitate handling the slider 24 and the terminal 20 together as a unit will now be described with reference to FIG. 4. Housed within the thickened rearward portion of the terminal 20 is a pointed pin 82 which is biased by a spring 84 to extend the pin 82 by a predetermined amount out from the bottom of the terminal 20. When the slider 24 is in its rearmost position on the terminal 20 as depicted in FIG. 4, the pointed tip of pin 82 will lodge in an indentation 86 in the top surface of the bottom slider plate 32, thereby tending to keep the slider 24 in the position shown. However, when it is desired to move the slider 24 forward, the handle 26 can be urged forward without great effort to cause the pin 82 to lift up as the indentation 86 moves forward beyond the pin 82. The pin 82 will snap back into its fully extended position when the rearward edge of the bottom slider plate 32 passes beyond the pin 82. It will be appreciated that the foregoing sequence of events occurs in reverse order when the slider 24 is returned to its rearmost position.

It will be appreciated from the foregoing description that the device 10 enables the connection of the ends of a separable zipper with relative ease when compared to prior-art devices employing the conventional pin-and-socket terminals. The principle advantage of the present invention over such prior-art devices is the relatively large size of the disc 28 and its cooperating receiving aperture 56 which permits the terminals 20 and 22 to be brought together conveniently in the direction perpendicular to the slider working plane and then interlocked by a slight rotational movement. It has been found that such an arrangement requires less dexterity to operate than the conventional pin-and-socket terminal arrangement.

Another advantage which is inherent in the design of the device 10 when employed with the zipper on a jacket or similar item of apparel is that the device 10 can readily be adapted to permit its engagement and the fastening of the zipper rows 12 and 14 with one hand by the wearer. This is accomplished by securing gripper strips (not shown), such as the material sold under the trademark Velcro, to the back outer surface (not visible in the illustrated views) of the floor plate 48 and on a front surface of a belt buckle (not shown) or the like of the wearer. The wearer will then be able to secure the receiving terminal 22 to the belt buckle. Next, the slider disc 28 can be inserted into the aperture 56 and slider 24 and terminal 20 rotated to interlock the element 60 in the notch 64. Finally, the wearer can pull the slider 24 forward using the handle 26 to fasten the zipper rows 12 and 14. It will be appreciated that each of the foregoing steps can be performed using only one hand.

Another embodiment of my invention will now be described with reference to FIGS. 5–11. A zipper terminal device of my invention is designated generally by reference number 110 in FIGS. 7–11. The device 110 is designed to facilitate connecting the ends of the type of separable zipper sometimes referred to in the art as a two-way slide fastener which employs a first slider for fastening the zipper rows and a second slider for at least partially unfastening the zipper rows to permit the zipper to be open at both ends and fastened in the middle.

The device 110 includes a slider base terminal 120, which is separately illustrated in FIG. 6, and a receiving terminal 122, which is separately illustrated in FIG. 5. The terminals 120 and 122 are securely fastened at the rearmost ends of zipper rows 112 and 114 which are schematically depicted in phantom along with their supporting stringers 116 and 118 in FIGS. 5 and 6. The zipper rows 112 and 114 and stringers 116 and 118 are not shown in FIGS. 7–9 for ease and clarity of illustration.

Figure 8:
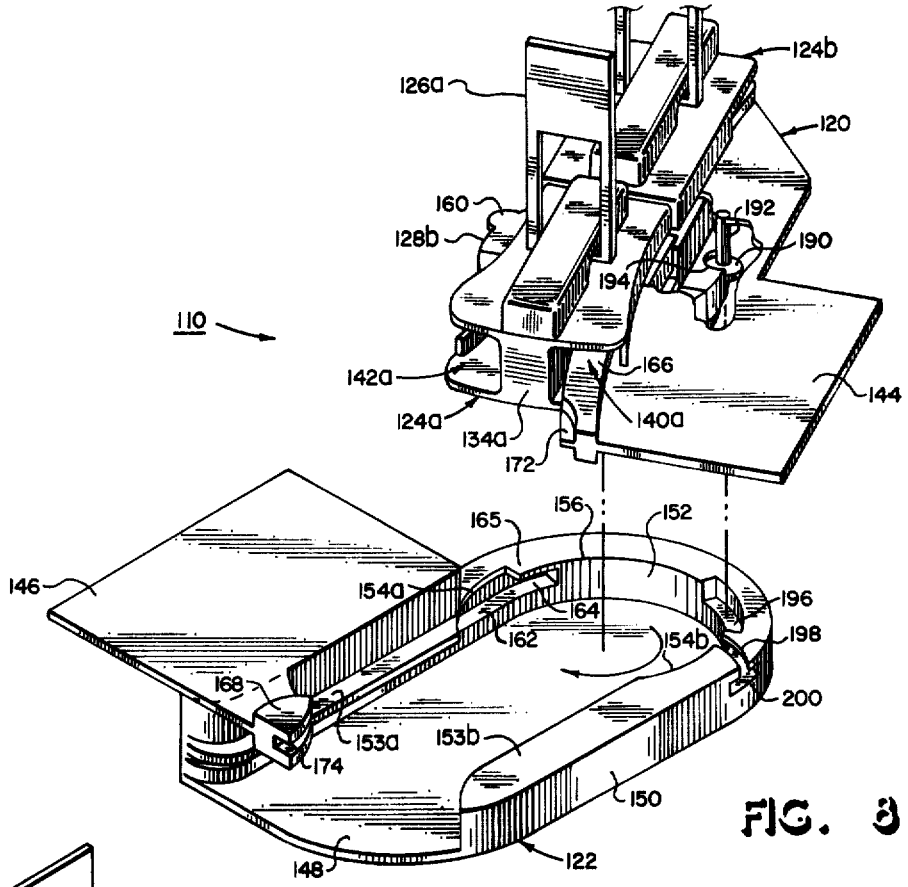
FIG. 8 is a perspective view of the sliders and terminals oriented in the same relative position as in FIG. 7 but looking from an overhead forward point of view from which the right sides of the sliders are visible.

As seen best in FIG. 8, the slider base terminal 120 is adapted to carry two back-to-back sliders consisting of a leading slider 124a and a trailing slider 124b. The sliders 124a and 124b are manually operable by means of pivotally mounted handles 126a and 126b respectively. As seen in FIG. 7, a generally annular disc 128 is disposed in overlapping relationship on the bottom surfaces of the sliders 124a and 124b. The disc 128 comprises a first semicircular portion 128a affixed to the bottom of the leading slider 124 a and a second semicircular portion 128b affixed to the bottom of the trailing slider 124b. When the sliders 124a and 124b are in their rearmost abutting positions on the base terminal 120 as seen in FIG. 7, the disc halves 128a and 128b are kept in longitudinal alignment by a tongue-and-groove arrangement seen in dotted outline and designated by reference number 129.

Figure 9:
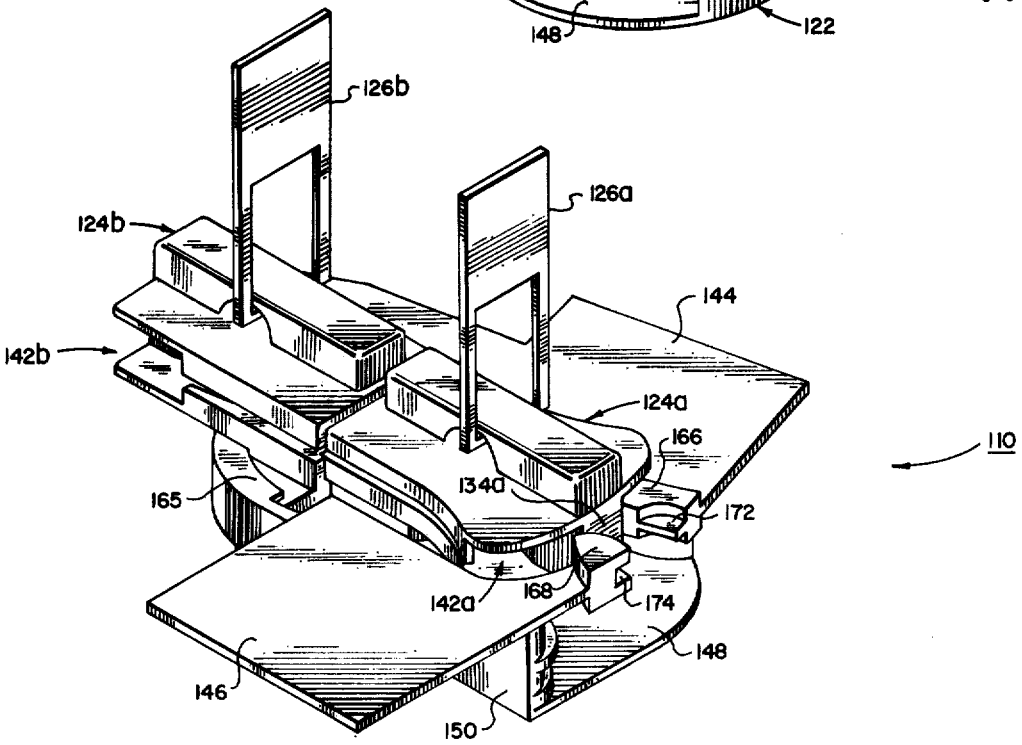
FIG. 9 is a perspective view of the sliders and terminals interlocked in operative engagement looking from an overhead forward point of view from which the left sides of the sliders are visible.

Referring to FIGS. 8 and 9, the sliders 124a and 124b include top and bottom plates with adjoining side rims, the plates being interconnected by respective center posts 134a and 134b, all of which are essentially conventional in construction like their corresponding parts in the single-slider embodiment 10 previously described with reference to FIGS. 1-4. The leading slider 124a has right and left slider ports 140a and 142a on opposite sides of the center post 134a, as seen best in FIG. 8. Likewise, the trailing slider 124b has right and left slider ports 140b and 142b on opposite sides of the center post 134b, as seen best in FIG. 7.

With reference again to FIGS. 5 and 6, the terminals 120 and 122 are securely fastened to their respective zipper rows 112 and 114 by attaching the strings 116 and 118 to respective wing plates 144 and 146 in a suitable manner. The wings 144 and 146 lie in the same planes as their respective stringers 112 and 114 and become coplanar in the slider working plane whenever the terminals 120 and 122 are operatively engaged, such as in FIG. 9.

Referring again to FIG. 8, the receiving terminal 122 includes a floor 148 lying in a plane below and parallel to the wing 146, the floor 148 and wing 146 being interconnected by one side of a generally U-shaped sidewall 150. The sidewall 150 includes a semicircular rearward portion 152 adapted to receive the disc 128 during initial engagement of the terminals 120 and 122. The forward portions of the sidewalls 150 are provided with shelves 153a and 153b which extend transversally inward. The shelves 153a and 153b terminate rearwardly in curved edges 154a and 154b, respectively, and together with the curved wall portion 152 provide an arced receiving aperture 156 subtending an angle somewhat in excess of 180 degrees. The disc 128 includes a chamfered lower edge 158 (FIG. 7) adapted to facilitate guiding the disc 128 into the receiving aperture 156 as the assembly of the sliders 124a and 124b and their base terminal 120 are brought down into engagement with the terminal 122 from the position shown in FIG. 8. The disc half 128b on the trailing slider 124b includes a locking element 160 in the form of a flat tongue-like flange protruding transversely from the top left surface of the disc half 128b, as shown in FIG. 8 and seen in dotted outline in FIG. 11. When the terminals are initially engaged, the locking lement 160 comes to rest on a shoulder 162, which is visible in FIG. 8. The shoulder 162 extends rearward into a notch 164 formed within the sidewall 150 under an overhanging shelf 165. The locking element 160 is adapted to lodge within the notch 164 to assist in interlocking the terminals 120 and 122, as will be described more fully below.

Referring briefly again to FIG. 6, the slider base terminal 120 is provided with an elongated guide segment 166 which curves slightly to the right away from the rearward projection of the zipper row 112. When the sliders 124a and 124b are in their rearmost position on the base terminal 120, the elongated guide segment 166 extends through the right side of each slider as seen best in FIG. 7.

Referring briefly again to FIG. 5, the receiving terminal 122 includes a guide segment 168 cantilevered inward from the forward portion of the wing plate 146. The guide segment 168 is adapted to guide the center post 134a into operative proximity with the rearmost end of the zipper row 114 as will be appreciated from the view of FIG. 9. As seen in FIGS. 8 and 9, the guide segment 166 includes a tongue 172 adapted to mate with a groove 174 in the guide segment 168.

In order to keep the sliders 124a and 124b on the slider base terminal 120 when the terminals 120 and 122 are separated, the terminal 122 is provided with an end stop 178, as shown in FIG. 6. The end stop 178 extends above the adjacent top surface of the guide segment 166 so that the end stop 178 will lodge within a recessed surface 180 under the top plate of the slider 124b as seen in FIG. 7, thereby preventing rearward movement of the slider 124b from the position shown in FIG. 7.

Referring again to FIGS. 7 and 8, the slider base terminal 120 is provided with a circular plate 190 which is carried below the wing 144 by means of a downwardly extending rod 192. The plate 190 is adapted to lodge partially within a notch 194 in an upper surface portion of the disc half 128b when the slider 124b is in its rearmost position on the terminal 120 as seen in FIG. 7. The plate 190 extends outward from the disc half 128b so that it will come to rest on a recessed surface 196 in the curved rearward portion 152 of the sidewall 150 as depicted in FIG. 8. The terminal 122 is provided with a slot 198 and an outlet 200 adapted to permit the rod 192 and the plate 190 to pass laterally out the sidewall 150 in order to separate the terminals 120 and 122 as will be described more fully below with reference to FIG. 11.

The operation of the device 110 will now be described. With the sliders 124a and 124b in their rearmost positions on the slider base terminal 120 and the terminal 120 oriented at a slight angle relative to the receiving terminal 122 as shown in FIGS. 7 and 8, the terminals 120 and 122 are operatively engaged by bringing them together in the axial direction (i.e., the direction perpendicular to the floor 148) so that the disc 128 nests down within the receiving aperture 156. The slider base terminal 120 is then rotated relative to the receiving terminal 122 in the direction indicated by the arrow in FIG. 8 in order to bring the guide segment 168 into alignment in front of the left slider port 142a as depicted in FIG. 9. Once rotated into the position seen in FIG. 9, the locking element 160 moves into the notch 164, which is visible in FIG. 8, in order to prevent axial movement of the terminals 120 and 122 relative to each other. In order to further assist in axially interlocking the terminals 120 and 122, it wil be appreciated from the view in FIG. 8 that the outer edge of the circular plate 190 will have moved from its initial resting position on the recessed surface 196 under the rearward portions of the shelf 153b straddled by the slot 198.

Figure 10:
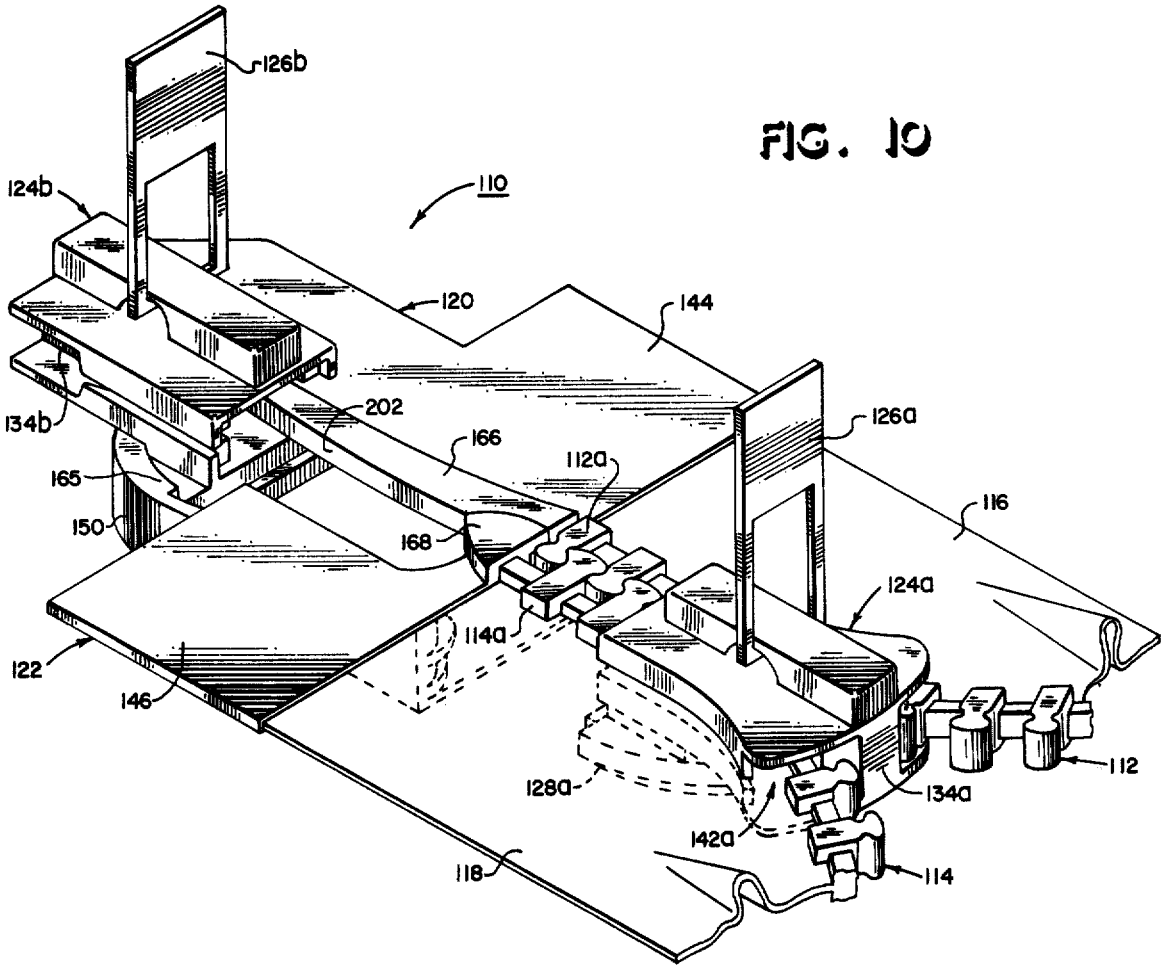
FIG. 10 is a perspective view from essentially the same point of view as FIG. 9 but with the first slider pulled forward to fasten and rearmost ends of the zipper rows.

Once the terminals 120 and 122 have become operatively engaged and interlocked in the foregoing manner, the leading slider 124a can be pulled up the zipper rows 112 and 114 to progressively fasten the teeth as depicted in FIG. 10. As long as the trailing slider 124b is left in its rearmost position, the terminals 120 and 122 will remain interlocked against separation. Relative movement in the axial direction is prevented at the rear by the floor 148 abutting the bottom of the disc half 128b, the locking element 160 lodged under the shelf 165, and the circular plate 190 lodged under the rearward portions of the shelf 153b. Relative movement of the terminals 120 and 122 in the axial direction is prevented at the front by the interlocked tongue 172 and groove 174, which are seen separated in FIG. 9. Relative movement of the terminals 120 and 122 in the transverse directions is prevented by the disc half 128b nested rearwardly within the sidewall 150, the interlocking effect of the rearmost zipper teeth 112a and 114a, and the side rims of the slider 124b grasping the adjacent edges of the elongated guide segment 166. During the forward movement of the sliders 124a and 124b, the shelves 153a and 153b and the adjacent portions of the wall 150 and floor 148 below the shelves 153a and 153b serve as guide chutes for the edges of the disc halves 128a and 128b which extend beyond the sides of their respective sliders 124a and 124b, thereby keeping the sliders 124a and 124b in proper alignment for engaging the rearmost ends of the zipper rows 112 and 114.

Figure 11:
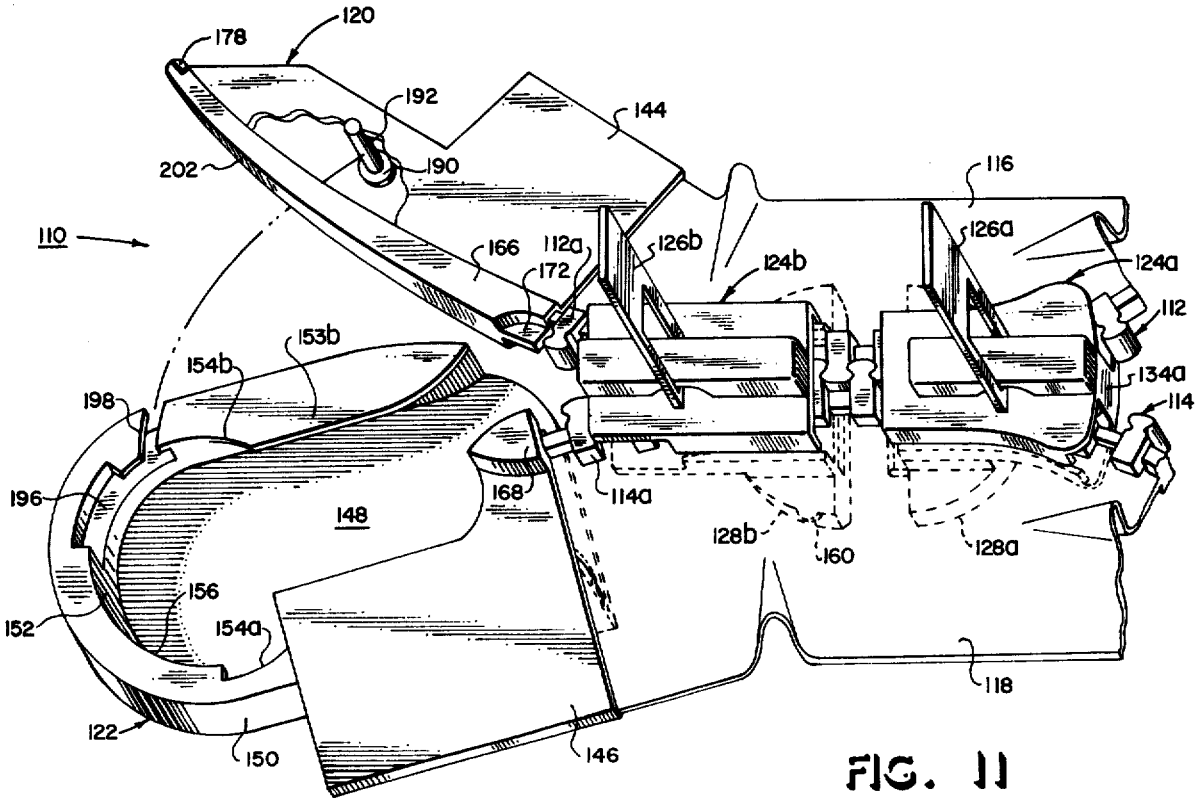
FIG. 11 is a perspective view from a slightly higher elevation than FIG. 10 but with the second slider pulled forward to disengage the terminals and the rearmost zipper teeth.

Referring to FIG. 11, it will be appreciated that the rearward ends of the zipper rows 112 and 114 can be separated by pulling the trailing slider 124b forward as far as desired up to the point where it once again abuts the leading slider 124a. Although the sliders 124a and 124b are shown relatively close to the terminals 120 and 122 for ease of illustration, it will be appreciated that the leading slider 124a can be pulled any desired distance up the zipper rows 112 and 114 up to the opposite end (not shown) and that the trailing slider 124b can be positioned at any point between its rearmost position as seen in FIG. 10 and the leading slider 124a.

With reference to FIGS. 10 and 11, the separation of the terminals 120 and 122 is achieved as follows. As the trailing slider 124b is pulled forward from its rearmost position as seen in FIG. 10, the center post 134b (visible more clearly in FIG. 7) progressively forces the elongated guide segment 166 to the right by bearing against a curved inner face 202 extending along the length of the guide segment 166. The initial forward movement of the slider 124b forces the rod 192 out through the slot 198 since the rod 192 is carried on the terminal 120 in fixed relationship to the guide segment 166. As the slider 124b continues its forward movement, the tongue 172 at the forward end of the guide segment 166 pulls free from its mating groove 174 in the guide segment 168. As the slider 124b exits from terminal 122, the center post 134b begins to progressively disengage the individual zipper teeth in the rows 112 and 114. In the view of FIG. 11, the slider 124b is shown after having just passed beyond the rearmost zipper teeth 112a and 114a.

It will be appreciated from FIG. 11 that the terminals 120 and 122 can be brought back into interlocking relationship to close the rearward ends of the zipper rows 112 and 114 by merely pulling the trailing slider 124b back into its rearmost position within the receiving terminal 122. In particular, as the center post 134b of the slider 124b nears the guide segments 166 and 168, the fastening action of the slider 124b working on the zipper rows 112 and 114 pulls the guide segments 166 and 168 into proper position for passing into the respective slider ports 140b and 142b (visible in FIG. 7). As the slider 124b is pulled partially into the receiving terminal 122, the guide segments 166 and 168 begin to move through the slider 124b, thereby causing the base terminal 120 to begin to swing toward the receiving terminal 122. By the time the guide segment 168 passes out the forward end of the slider 124b, the disc half 128b will have moved between the forward ends of the U-shaped sidewall 150 and under the shelves 153a and 153b, thus assuring that the slider 124b will be guided properly back into its rearmost position in terminal 122. As the slider 124b approaches its rearmost position, the rod 192 is pulled back through the slot 198 and finally comes to rest in the notch 194 in the disc half 128b, as previously described with reference to FIG. 7. It will of course be appreciated that the leading slider 124a can then be moved rearward to unfasten the zipper rows 112 and 114 and then be pulled into abutting relationship with the trailing slider 124b to return to the position shown in FIG. 9. Disconnecting the terminals 120 and 122 is then easily achieved by merely rotating the terminals in the direction opposite from the arrow shown in FIG. 8 until the locking element 160 is withdrawn from the notch 164, whereupon pulling upward on the wind 144 and downward on the wing 146 will achieve separation.

Those skilled in the art will appreciate from the foregoing description that the device 110 enables the connection of the ends of the a two-way slide fastener with relative ease when compared to prior-art devices employing the conventional pin-and-socket terminals. One merely brings the disc 128 down into the receiving aperture 156 and rotates the terminals 120 and 122 slightly as previously described in order to bring the terminals 120 and 122 into interlocking engagement. Once the terminals 120 and 122 are thus engaged and interlocked, they cannot be separated by the mere forward movement of the leading slider 124a, which occurrence has been a problem with conventional pin-and-socket terminal devices.

The present invention contemplates various modifications and alternative embodiments. For example, an alternate embodiment of the device 110 in which the disc 128 is an integral piece secured entirely to the bottom of either slider 124a or 124b and the other slider is essentially conventional in construction is contemplated by the present invention. Other modifications and alternative embodiments are within the spirit and scope of the present invention as defined by the appended claims.

What is claimed is:

1. A device for connecting the ends of a separable zipper [of the type] having first and second rows of [teeth] *interlocking elements* disposed along [the] *respective* opposed [edges of supporting] stringers, [the device] comprising:

a slider [having top and bottom plates held in spaced-apart parallel planes by a center post, the plates having facing side rims defining first and second side slots through which the stringers pass, the front edges of the side rims defining first and second ports on opposite sides of the center post, the ports leading to a common passageway within the slider where the teeth are] *for* progressively [engaged] *engaging* or [disengaged] *disengaging said interlocking elements* depending on the direction of slider movement;

a base terminal disposed at the rearward end of the first row of [teeth and] *interlocking elements* adapted to carry the slider when the [rows] *interlocking elements* are [fully] disengaged;

a receiving terminal disposed at the rearward end of the second row of [teeth] *interlocking elements*, the receiving terminal including wall portions defining an aperture; and first means [affixed to the bottom of] *carried beneath and integral with* the slider, said means being insertable into the aperture in [the] *a* direction generally perpendicular to [said parallel planes] *the direction of movement of said slider along the interlocking elements* to [permit] *cause* the [ports of the] slider to [be aligned for receiving] *receive* the [rearmost ends of the rows of teeth] *interlocking elements* upon forward movement of the slider.

2. The device of claim 1 further comprising:

second means for interlocking the terminals against separation when the slider is pulled forward to engage the rows of [teeth] *interlocking elements.*

3. The device of claim 2 wherein said first means comprises a generally annular disc of a first diameter, and the aperture of the receiving terminal defines an arc [in excess of] *of about* 180 degrees with a diameter slightly larger than said first diameter.

4. The device of claim 2 wherein said second means includes a locking element disposed on the base terminal and adapted to lodge in a notch in the receiving terminal upon rotating the terminals to bring the rearmost ends of the zipper rows into operative proximity in front of [their respective slider ports] *the slider.*

5. The device of claim 4 further comprising a sloped ramp formed on the upper edge of a curved rearward wall of the receiving terminal, and wherein the locking elements extends from a rearward portion of the base terminal and is adapted to be guided by the ramp into the notch by a slight relative rotation of the terminals.

6. The device of claim 1 further comprising means for locating the slider in its rearmost position on the base terminal when the terminals are separated.

7. The device of claim 1 further comprising:

a second slider similar to the first-mentioned slider and disposed rearward from the first-mentioned slider, the second slider being oriented to progressively disengage the zipper rows upon forward movement after the zipper rows have at least been partially engaged by the forward movement of the first-mentioned slider.

8. The device of claim 7 wherein said first means includes first and second [semicircular] portions of a disc affixed at the bottoms of the respective first and second sliders and [disposed] *configured* to form a single annular disc when the sliders are located in their rearmost positions on the base terminal, the annular disc being insertable in the aperture of the receiving terminal to bring the terminals into operative engagement.

9. The device of claim 7 further comprising third means for interlocking the terminals against separation when the terminals are rotationally positioned so that the rearmost ends of the zipper are aligned in front of the [respective ports of the] first-mentioned slider.

10. The device of claim 9 wherein the third means remains operative to interlock the terminals against separation whenever the second slider is nested into the receiving terminal independent of the position of the first slider.

*11. The device of claim 7 wherein said first means is carried by the first slider.*

*12. The device of claim 7 wherein said first means is carried by the second slider.*

* * * * *